Figure 1:
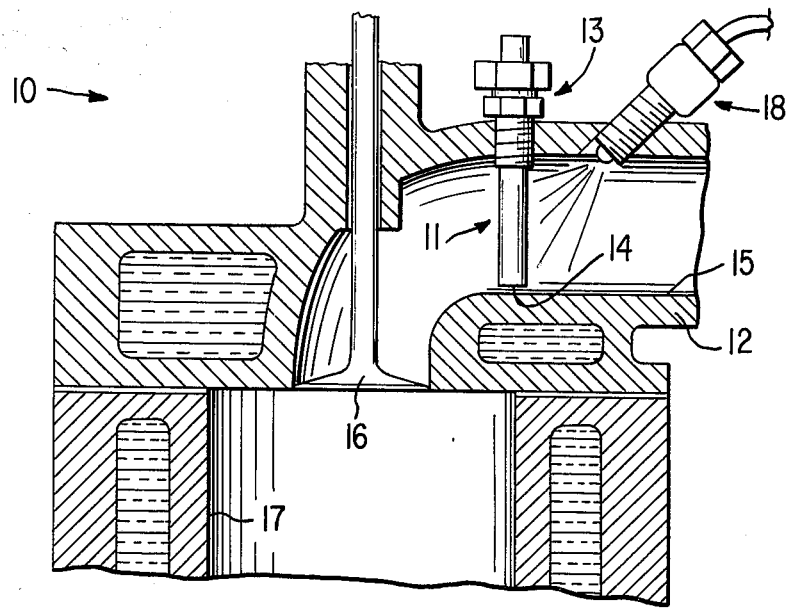

United States Patent [19]
Jordan

[11] 3,930,477
[45] Jan. 6, 1976

[54] ELECTRIC HEATING MEANS FOR FUEL VAPORIZATION IN INTERNAL COMBUSTION ENGINES

[76] Inventor: Wilmer C. Jordan, 3915 W. Wrightwood Ave., Chicago, Ill. 60647

[22] Filed: Aug. 24, 1973

[21] Appl. No.: 391,230

Related U.S. Application Data
[62] Division of Ser. No. 171,110, Aug. 12, 1971, Pat. No. 3,760,780.

[52] U.S. Cl.............. 123/122 F; 219/206; 219/207; 123/179 H
[51] Int. Cl.² ...................................... F02M 31/00
[58] Field of Search ............ 123/122 F, 122 H, 133, 123/179 H, 122 AA; 219/206, 207; 165/52

[56] References Cited
UNITED STATES PATENTS

| | | | |
|---|---|---|---|
| 2,175,738 | 10/1939 | Betry | 123/122 F |
| 2,576,401 | 11/1951 | Kimmel | 123/122 F |
| 2,623,978 | 12/1952 | Cantrell | 123/122 F |
| 3,556,065 | 1/1971 | Jordan | 123/122 F |
| 3,601,110 | 8/1971 | Kamazuka | 123/122 F |
| 3,760,780 | 9/1973 | Jordan | 123/122 F |

FOREIGN PATENTS OR APPLICATIONS

| | | | |
|---|---|---|---|
| 536,233 | 5/1941 | United Kingdom | 123/122 F |

*Primary Examiner*—Charles J. Myhre
*Assistant Examiner*—R. H. Lazarus
*Attorney, Agent, or Firm*—Brezina & Lund

[57] ABSTRACT

Electric heating means for fuel vaporization in internal combustion engines to improve the efficiency, performance and starting thereof, an optimum amount of electrical power being supplied to the heating means during operation of the engine. An important feature relates to the use of heating units mounted in an intake manifold preferably with there being one heating unit for each engine cylinder, mounted adjacent the intake valve. In an engine having fuel injection, a heating unit is mounted on the downstream side of each fuel injector. Another important feature relates to the provision of means controlled by ambient temperature sensing means for automatically adjusting the optimum amount of electrical power supplied to electric heating and vaporizing means.

4 Claims, 2 Drawing Figures

U.S. Patent  Jan. 6, 1976  3,930,477

ELECTRIC HEATING MEANS FOR FUEL VAPORIZATION IN INTERNAL COMBUSTION ENGINES

This application is a division of my copending application Ser. No. 171,110, filed Aug. 12, 1971, now U.S. Pat. No. 3,760,780, issued Sept. 25, 1973.

This invention relates to electric heating means and for fuel vaporization in internal combustion engines and more particularly to improvements upon the electric heating means disclosed and claimed in my U.S. Pat. No. 3,556,065, issued Jan. 19, 1971.

As disclosed in my aforesaid U.S. Pat. No. 3,556,065, a very substantial increase in the efficiency and performance of internal combustion engines can be obtained by installing electric heating means to radiate heat into an air-fuel mixture, with the amount of electrical power supplied to the heater means being effective to cause radiation of an optimum amount of heat into the mixture.

In accordance with the disclosure of my aforesaid U.S. Pat. No. 3,556,065, electric heater means may be disposed within or below a carburetor and my aforesaid application Ser. No. 171,110 discloses a highly advantageous arrangement wherein one or more electric heater units are installed in a plate which is installed in a carburetor and the intake manifold of an engine. Such arrangements are highly satisfactory, especially when applied to existing engines of conventional design, the electric heater units being readily installed in or below the carburetor.

I have conceived, however, that the heating of an air-fuel mixture in accordance with my U.S. Pat. No. 3,556,065 can be accomplished in other ways and can be applied to engines having different designs such as, for example, engines utilizing fuel injectors. I have also conceived of refinements operative for insuring application of an optimum amount of heat and improving engine performance over a wide range of operating conditions.

In accordance with an important feature of the invention, the principles of my U.S. Pat. No. 3,556,065 are applied to an arrangement wherein heating units are mounted in an intake manifold, preferably with one heating unit for each cylinder mounted closely adjacent the intake valve thereof. With this arrangement, the time between vaporization of the fuel and entry into the engine cylinder is minimized and proper vaporization of the fuel as it enters the cylinder is insured.

In accordance with a specific feature, the heater units are mounted in an engine having fuel injection, a heater unit being disposed on the downstream side of each fuel injector, between the fuel injector and the intake valve.

Another important feature relates to control of the amount of heat in accordance with ambient temperature, to extend the range of operation in which optimum results are obtained. Tests performed indicate that this arrangement is particularly desirable in combination with the mounting of heating units in the intake manifold which is more sensitive to changes in ambient temperature, but this arrangement can be applied to arrangements in which heating units are mounted in or below a conventional carburetor.

Figure 2:
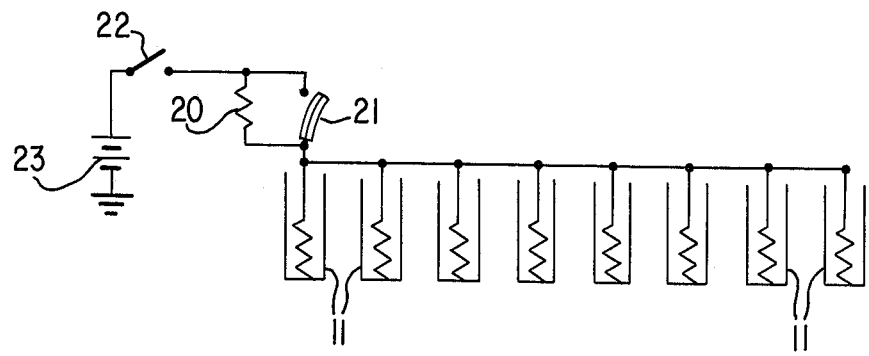

This invention contemplates other objects, advantages and features which will become more fully apparent from the following detailed description taken in conjunction with the accompanying drawings which illustrate preferred embodiments and in which:

FIG. 1 is a sectional view showing the mounting of an electric heating unit adjacent one intake valve of an internal combustion engine; and FIG. 2 is a schematic electrical diagram for showing a circuit for energizing heating units according to FIG. 1.

Reference numeral 10 generally designates an arrangement according to the invention in which a heating element 11 is mounted in the intake manifold 12 of an engine by support means 13. Element 11 preferably has a construction similar to that of the element illustrated in FIG. 4 of my aforesaid copending application Ser. No. 171,110, now U.S. Pat. No. 3,760,780, with the resistance wire being in a terminal end portion of the element. A terminal end 14 of the element 11 is preferably positioned in spaced relation to an adjacent portion of a flow passage 15, to prevent direct conduction of heat to the wall of the intake manifold.

The element 11 is positioned in the intake manifold 12 adjacent an intake valve 16, operative to admit the fuel-air mixture into a cylinder 17 for combustion therein, and in the case of a multiple cylinder engine, an individual heating element is similarly mounted with respect to the intake valve for each cylinder.

In the illustrated arrangement, a fuel injector 18 is provided for injecting a controlled amount of fuel into the passage 15 at an appropriate time during each cycle of operation of the engine, and the heating element 11 is positioned between the fuel injector 18 and the intake valve 16. Preferably, the heating element 11 is positioned as shown with the terminal end portion being generally aligned with the fuel injector 18, so that fuel injected by the injector 18 is immediately exposed to the radiant heat from the element 11 to be vaporized.

Although illustrated in combination with the fuel injector 18, the arrangement can be used with an engine having the more conventional type of throttle valve means in which fuel is supplied into a carburetor. In either case, the amount of electrical power supplied to the heating element should be within the range as disclosed in my U.S. Pat. No. 3,556,065.

FIG. 2 shows a circuit for energizing the units 11 which are connected in parallel and through a resistor 20, shunted by a bimetal switch 21, and through a switch 22, which may be the accessory switch, to the ungrounded terminal of a battery 23. The bimetal switch 21 is exposed to ambient air and may, for example, be located in front of the radiator in a conventional automobile. It is arranged to close when the ambient temperature drops below a predetermined temperature and to open when the ambient temperature rises above that predetermined temperature. Tests performed thus far indicate that the arrangement of FIG. 1, with an individual heating element for each cylinder, is more sensitive to changes in ambient temperature and that the automatic adjustment provided by the circuit is desirable. The switch 21 may, for example, be arranged to close when the ambient temperature drops below approximately 35° and the value of the resistor 20 may be such in relation to the values of the resistance elements of the heating elements 11 as to increase the power by ten percent when the switch 21 is closed.

It is noted that additional bimetal or other temperature responsive elements may be employed to obtain more refined adjustment of power in accordance with changes in ambient temperature and a similar type of circuit may be employed in conjunction with heating elements mounted in or in close proximity to a conventional carburetor. In all cases, regardless of where the heating means is located in the air-fuel flow path, the amount of electrical power supplied within each range of ambient temperature should be within the optimum range for obtaining maximum performance, according to my aforesaid patent.

It will be understood that modifications and variations may be effected without departing from the spirit and scope of the novel concepts of this invention.

I claim:

1. In apparatus for improving the performance of an internal combustion engine operable under certain normal ranges of load, speed and ambient temperature conditions, said engine including a plurality of cylinders, flow path means for flow of air into said cylinders, an intake valve for each cylinder for flow from said flow path means thereinto, fuel injection means positioned in spaced relation to each intake valve for injecting fuel into said flow path means to mix with the air flowing through the associated intake valve into an associated cylinder, and throttle valve means for controlling the flow of air into said flow path means, said engine having characteristics such that an optimum amount of radiant heat applied to enhance vaporization of fuel within said flow path means between said fuel injector means and said intake valves is effective to cause said engine to develop maximum average torque and acceleration while operating within said normal ranges of load, speed and ambient temperature conditions and with said throttle valve means fully open, average torque and acceleration being reduced in proportion to a reduction in the amount of radiant heat below said optimum amount and being also reduced in proportion to an increase in the amount of radiant heat above said optimum amount, electric heating means for each cylinder, means arranging said electrical heating means for installation in said flow path means between said fuel injection means and the associated intake valve, and electrical connection means arranged for continuously supplying an optimum amount of electrical power to all of said heating means at all times during operation of said engine, said optimum amount of electrical power being predetermined in accordance with said characteristics of said engine and being effective to cause radiation of said optimum amount of radiant heat from said heating means into the air-fuel mixture in said flow path means.

2. In apparatus as defined in claim 1, each of said electrical heating means comprising an elongated electrical heating unit having an outer metallic housing and an electric resistance element positioned within said housing, a portion of said outer metallic housing being positioned directly in the path of fuel injected by the associated fuel injection means.

3. In apparatus as defined in claim 2, said portion of said outer metallic housing being a terminal end portion thereof and said electric resistance element being positioned only within said terminal end portion.

4. In apparatus as defined in claim 3, wherein said engine includes an intake manifold having walls defining said flow path means, said terminal end portion of said outer metallic housing having a terminal end spaced a short distance from one of said walls and the opposite end of said housing means being fixedly supported from an opposite wall of said manifold.

* * * * *